Jan. 22, 1957 C. L. ISBORN 2,778,955

SHIFT REGISTER

Filed April 12, 1954

INVENTOR:
Carl L. Isborn
By Beale Benet[?]
Louis A. Kline
John J. Matlago, Agent
His Attorneys United States Patent Office 2,778,955

Patented Jan. 22, 1957

2,778,955

SHIFT REGISTER

Carl L. Isborn, Hawthorne, Calif., assignor, by mesne assignments, to The National Cash Register Company, a corporation of Maryland Application April 12, 1954, Serial No. 422,550

8 Claims. (Cl. 307—88)

This invention relates to electronic shift registers and more particularly to a novel ferro-resonant type shift register.

Multi-stage storage register circuits for binary information which have the ability to shift information to successive stages under the control of input pulses are highly useful in electronic computers. It has been previously shown, described, and claimed in the co-pending Isborn applications, Serial No. 175,784, filed July 25, 1950; and Serial No. 417,625, filed March 22, 1954, that ferro-resonant type flip-flop circuits can be provided comprised of reactive components. Since these flip-flop circuits are relatively small and their power requirements are low, it is highly desirable to connect these flip-flop circuits so as to form shift registers capable of storing and shifting large amounts of binary information.

It is accordingly an object of this invention to provide a novel ferro-resonant type shift register having low power requirements.

It is another object of this invention to provide a shift register of relatively simple, economical construction.

It is a further object of this invention to provide novel interconnecting means for ferro-resonant flip-flop circuits.

Briefly, the present invention comprises an A. C. voltage supply connected across a cascade of ferro-resonant type flip-flop circuit stages. Each stage has a pair of conduction paths, only one of which can have relatively high current, while the other simultaneously has relatively low current. The current status of the paths is capable of being reversed on application of a trigger pulse thereto. Corresponding paths of adjacent flip-flop circuit stages are connected to ground of the voltage supply by windings which comprise the primary of a transformer interconnecting the stages. These primary windings are wound so that the induced voltages oppose each other. The secondary winding of each transformer has its output connected to the starting electrode of a neon bulb gate which connects a source of shift pulses to the trigger input of each of the succeeding stages. Each neon bulb gate passes pulses to the trigger input of a flip-flop circuit stage only when the preceding stage is in a different state. Thus, it is only when the paths connected to a transformer are in an opposite conducting status that the stepped up voltage in the transformer secondary is capable of ionizing the neon bulb gate so as to enable shift pulses to pass therethrough.

Other objects and advantages of the present invention will be apparent from the following description of the drawings in which.

Figures 1, 2, 3:
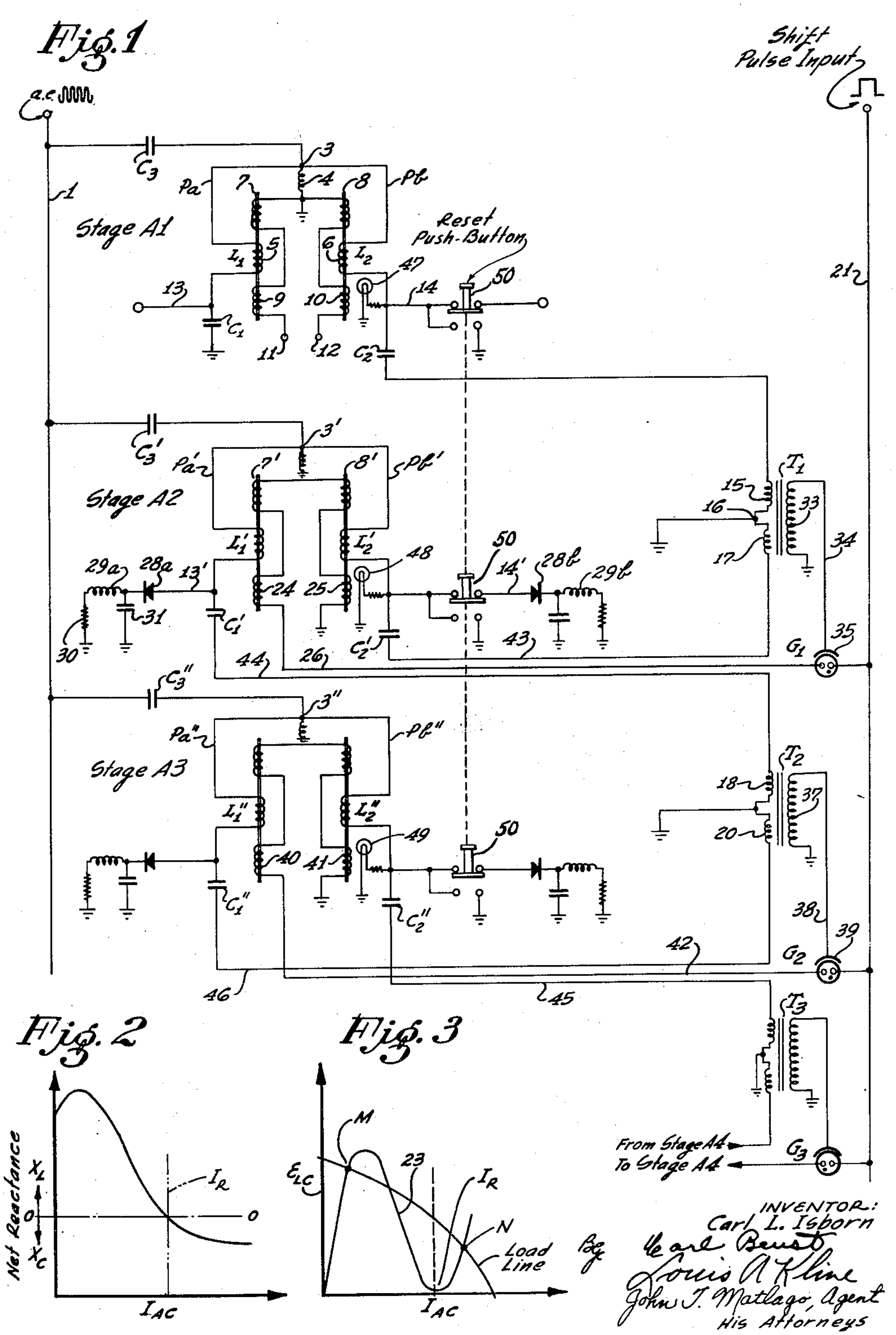
Fig. 1 is a schematic diagram of a ferro-resonant type shift register showing the present invention.
Figs. 2 and 3 are graphs for explaining the theory of operation of the ferro-resonant branches of the flip-flop circuits used in the shift register.

Reference is first made to Fig. 1 where a preferred embodiment of this invention is presented. For simplicity, only three stages of a multi-stage shift register are shown. These stages, designated A1, A2, and A3, respectively, are each comprised of a ferro-resonant flip-flop circuit. Inasmuch as the basic circuits of the three stages are similar, only stage A1 will be particularly described; and the corresponding details of stage A2 will bear like reference designations with a prime, while those of stage A3 will be distinguished by a double prime. Thus stage A1 includes two ferro-resonant paths, P*a* and P*b*. Path P*a* includes an inductor $L_1$ in series with a capacitor $C_1$ and path P*b* includes an inductor $L_2$ in series with a capacitor $C_2$. The inductor ends of paths P*a* and P*b* are joined at junction 3 which is connected through a capacitor $C_3$ to voltage supply line 1 of a low impedance A. C. source. An R. F. choke 4 provides a D. C. return to ground for junction 3. Inductors $L_1$ and $L_2$ are comprised of windings 5 and 6 about cores 7 and 8, respectively. These cores are preferably formed by rolling a thin sheet of ferro-magnetic material into a tube having length-to-diameter ratio on the order of 10 to 1. The capacitor $C_1$ is returned directly to ground of the A. C. source while capacitor $C_2$ is returned to ground by way of a first primary winding 15 of a transformer $T_1$. It should be understood that the inductance added to path P*b* by the winding 15 is small as compared to inductance $L_2$ and hence can be regarded as a part of the latter when considering the overall inductance of the path.

Input trigger winding 9 is wound about the core 7 of inductor $L_1$ and a similar input trigger winding 10 is wound about the core 8 of inductor $L_2$. One end of each of the trigger windings 9 and 10 is connected to ground, and the other ends are connected to the two trigger input terminals 11 and 12, respectively. Two outputs, one from each path, are provided for the flip-flop circuit. Output lead 13 is connected to the common point of inductor $L_1$ and capacitor $C_1$ of path P*a*, and output lead 14 is connected to a similar point of path P*b*.

Each of the LC paths P*a* and P*b* has an inherent bistable operation according to the principle of ferro-resonance. The bistability of path P*a*, for example, as connected between junction 3 and ground, can be explained by referring to Figs. 2 and 3. The ferromagnetic core 7 of inductor $L_1$ causes the reactance $X_L$ of the inductor $L_1$ to vary as a function of current therethrough. The reactance $X_C$ of capacitor $C_1$, on the other hand, is fixed and its value is so chosen with relation to that of the inductor $L_1$ that the passing of a small amount of current through path P*a* results in the net reactance being inductive, as shown in Fig. 2. As more current is passed through the iron core inductor $L_1$, the inductive reactance of the current decreases until the resonant point indicated at $I_R$ is reached. A further increase of current causes the iron core to suffer A. C. saturation which results in a still further reduction of the effective inductive reactance of inductor $L_1$. This variation of net reactance with current can be shown to be regenerative for a predetermined operating voltage applied across the LC path such that the current can be made to jump between a stable point characterized by the net reactance being inductive, and a stable point characterized by the net reactance being slightly capacitative.

The jumping action of this circuit for a properly applied operating voltage is further explained by referring to the voltage-current characteristic curve shown in Fig. 3. As the A. C. voltage is increased, the voltage $E_{LC}$ across the LC path will first rise, reach a maximum, then decrease to a minimum at a current value $I_R$. A further increase of the current beyond $I_R$ causes the voltage $E_{LC}$ to again rise. It is to be noted that the slope 23 represents a negative reactance region which results in unstable operation of the circuit. But if the proper operating voltage is chosen and if the internal resistance of the circuit is relatively small, the LC path can be so operated that it will exhibit two possible stable values of $I_{AC}$, as shown by the graph of Fig. 3. Operating point M on the graph is chaarcterized by a low current and a high inductive reactance, while operating point N is characterized by a high current and a slightly capacitive reactance.

Referring again to the stage A1 flip-flop circuit of Fig. 1, the reactance of the common impedance $C_3$ is chosen such that one and only one of paths Pa and Pb can be in the resonant or highly conductive condition at a time. If both should try to go into resonance, the voltage at junction 3 would fall so low owing to the voltage drop across capacitor $C_3$ that neither path Pa nor path Pb will have a sufficient voltage across it to maintain resonance. On the other hand, if paths Pa and Pb should both try to go out of resonance, the voltage at junction 3 would rise to such a value that one path or the other should be forced into resonance. The flip-flop conduction status is sensed by means of the relative magnitude of A. C. voltage appearing on the output leads connected to each of the paths, such as output lead 14 connected to path Pb, for example. Thus, when path Pb is in the high current state, output lead 14 has a relatively large A. C. voltage thereon while output lead 13 connected to path Pa simultaneously has a relatively low A. C. voltage thereon.

In the preferred embodiment of Fig. 1, stage A1 is a double input flip-flop circuit while stages A2 and A3 are single input flip-flop circuits. The triggering of stage A1 will be first described. For example, assume that path Pa is initially in the relatively high conducting state and path Pb is in the relatively low conducting state. Upon applying a trigger pulse to input terminal 12, the trigger winding 10 is energized and the inductance of $L_2$ is momentarily reduced owing to near saturation of core 8. The inductive reactance of path Pb is consequently lowered resulting in the current increasing to a value characteristic of the relatively high operating state of the circuit. Inasmuch as both paths cannot be in the high operating state, path Pa simultaneously is found to change to the low operating state. The paths of the circuit are now in their opposite stable states and will remain there until a trigger pulse is applied to terminal 11 connected to the trigger coil of path Pa, at which time this latter path again jumps to the high current operating state, while path Pa simultaneously returns to the low current operating state.

The single input flip-flop circuits of stages A2 and A3 operate in accordance with the same principles of ferro-resonance discussed for the double input flip-flop of stage A1, with the exception of the manner of triggering the circuit. Referring to the single input flip-flop of stage A2, it is to be noted that trigger winding 24 of inductor $L_1'$ is connected in series with trigger winding 25 of inductor $L_2'$. Thus a signal applied on trigger input lead 26 of stage A2 energizes both trigger windings simultaneously. The flip-flop circuit of stage A3 has a similar triggering arrangement. The signals applied on the shift pulse input lead 21 are sensed on trigger input lead 26 of stage A2 dependent on the ionization status of a neon bulb gate $G_1$, and these signals are sensed on trigger input lead 42 of stage A3 dependent on the ionization status of a neon bulb gate $G_2$. The control of the gating operation of neon bulb gates $G_1$ and $G_2$ by transformers $T_1$ and $T_2$, respectively, will be discussed later.

Assume now, for purposes of explanation, that the flip-flop circuit of stage A2 is relatively highly conducting through path Pa', including inductor $L_1'$ therein, and that neon bulb gate $G_1$ is ionized, thus allowing a trigger pulse applied on the shift register input lead 21 to pass by way of input lead 26 onto trigger coils 24 and 25 of the flip-flop circuit.

In order to enable this circuit to be reliably triggered to an opposite operating status by trigger pulses applied on its single input, an inductive memory circuit is preferably connected to the output leads 13' and 14' of paths Pa' and Pb', respectively. As shown in connection with output lead 13', this memory circuit includes a rectifier 28a and a series inductor 29a connected to resistor 30 and capacitor 31 shunting the output lead to ground. A similar inductive memory circuit including rectifier 28b and inductor 29b is connected to the output lead 14'.

Consider now how inductors 29a and 29b serve as a reliable memory for aiding the triggering of the single input ferro-resonant flip-flop circuit. As previously stated, it is assumed that the flip-flop circuit of stage A2 is highly conducting through path Pa' including inductor $L_1'$ therein. Thus inductor 29a connected to the output path Pa' is initially drawing relatively high current while inductor 29b connected to the output of path Pb' is drawing relatively low current. The effect of a pulse applied to the trigger windings 24 and 25 via lead 26 is to nearly saturate inductor $L_2'$, thus tending to drive path Pb' into a relatively high current condition which results in a drop in voltage at junction 3'. As a result, the current in path Pa' starts to decrease. At the termination of the trigger pulse, the voltage at junction 3' again rises owing to the fact that neither path Pa' nor Pb' is in resonance at this instant. The effect of this rising voltage will be to force either path Pa' or path Pb' to go into resonance. Since path Pa' and inductor 29a were initially passing a relatively high current while path Pb' and consequently inductor 29b were passing a relatively low current, the latter path offers the least impedance to the higher voltage at junction 3', and thus path Pb' is favored to go into resonance over path Pa'. In other words, the output inductor 29a or 29b which is connected to the highly conductive path provides an inductive-kick, by the counter voltage action, when the current status of the flip-flop is interrupted by the trigger pulse. This inductive-kick persists after the trigger pulse is terminated in accordance with the time constant of the inductive memory circuit. This action effectively damps or loads the path which was previously in a high conducting status, thus favoring the other path to go into resonance.

The circuit arrangement of transformers $T_1$, $T_2$, $T_3$, etc. which serves to interconnect corresponding paths of stages A1 and A2, A2 and A3, etc. will now be described. As previously explained, path Pb includes the first primary winding 15 of transformer $T_1$ therein and is returned to ground by way of the center tap 16. In a like manner, the corresponding path Pb' of stage A2 is returned to ground through connection 43 which includes a second primary winding 17 of transformer $T_1$. Similarly, path Pa' of stage A2 is returned to ground through connection 44 which includes a first primary winding 18 of transformer $T_2$, and the corresponding path Pa'' of stage A3 is returned to ground by connection 46 which includes a second primary winding 20 of transformer $T_2$. The corresponding paths of the remaining stages of the shift register are similarly connected to transformers $T_3$, etc. It should be noted that the primary windings of each of the transformers, such as windings 15 and 17 of transformer $T_1$, are oppositely wound about the core of the transformer.

The secondary winding 33 of transformer $T_1$ is grounded at one end and the other end thereof is connected by lead 34 to a starter electrode 35 which is positioned about the envelope of neon bulb gate $G_1$. One internal electrode of neon bulb gate $G_1$ is connected to the shift pulse input lead 21, and the other internal electrode of gate $G_1$ is connected to lead 26 of the single input flip-flop circuit comprising stage A2. Similarly one end of secondary winding 37 of transformer $T_2$ is grounded and the other end thereof is connected by lead 38 to the starter electrode 39 which is positioned about the envelope of neon bulb gate $G_2$. Gate $G_2$ serves to connect the shift pulse input lead 21 to lead 42 of the single input flip-flop circuit comprising stage A3.

It will next be described how binary information introduced into the first stage A1 by the triggering of either terminal 11 or 12 can be shifted to succeeding stages of the register under control of shift pulses applied on input lead 21. For purposes of explanation, assume that when relatively high current is flowing through path P*b* of stage A1, the flip-flop is storing a "one" and when relatively high current is flowing through path P*a*, the flip-flop is storing a "zero." The conducting status of paths P*a'* and P*b'* of stage A2, P*a''* and P*b''* of stage A3, etc. are similarly interpreted. In order to visually indicate the binary information stored in a stage, each of the flip-flops has a light bulb connected to the path which when highly conducting corresponds to a "one" status. Thus light bulb 47 is connected to path P*b* of stage A1, and light bulbs 48 and 49 are connected to paths P*b'* and P*b''* of stages A2 and A3, respectively. It will next be assumed that stage A1 is registering a "one" therein, i. e., lamp 47 is lit; and that stages A2 and A3 are both registering "zero," i. e., lamps 48 and 49 are extinguished. Thus the stages, from top to bottom as shown in Fig. 1, are assumed to be initially registering the binary combination 100.

Consider next the operation of transformer $T_1$. Since path P*b* is assumed to be in a relatively high conducting status, a high current flows through the primary winding 15 of transformer $T_1$ connected in series therewith. However, the oppositely wound second primary winding 17 of transformer $T_1$, which is connected in series with path P*b'*, has a relatively low current therethrough. Because of the difference in current flow in primary windings 15 and 17, an induced R. F. output voltage is obtained on secondary winding 33. The output voltage is conveyed via lead 34 to the starter electrode 35 of neon bulb gate $G_1$. It is thus clear that transformer $T_1$ serves to sense the difference of current flow in corresponding paths of adjacent flip-flop circuits and to step up the voltage on the secondary output lead 34.

As a result of applying this R. F. voltage to the glass envelope of a neon bulb gate $G_1$, ionization of the gas contained therein will ensue so as to enable the first shift pulse applied on input lead 21 to pass through the neon bulb gate $G_1$ onto the trigger input lead 26 of stage A2. Thus the neon bulb $G_1$ is used as a switch which is opened and closed by the presence or absence, respectively, of a suitable R. F. voltage on its starter electrode 35.

Now consider the status of neon bulb gate $G_2$ when the first shift pulse is applied on input lead 21. As stated before, the shift register is initially assumed to be containing the binary combination 100; and consequently the opposing windings 18 and 20 of transformer $T_2$ both have relatively high current therethrough owing to the high current conducting status of paths P*a'* and P*a''* of stages A2 and A3, respectively. The high current through both opposing windings 18 and 20 effectively lowers the voltage on the secondary winding 37 of transformer $T_2$. As a result, the neon bulb gate $G_2$ is not ionized and the first shift pulse cannot pass onto lead 42 to trigger stage A3.

Thus, as a result of the first shift pulse on lead 21, the status of register stage A2 is changed from a "zero" to a "one," while the status of register stage A3 remains unchanged. Assuming that the contents of stage A1 has not in the meantime been altered, the shift register now reads 110. It is to be noted that with this content in the stages, neon bulb gate $G_1$ is now closed because opposed primary windings 15 and 17 both have an essentially equal (relatively high) current therethrough and the resulting voltage appearing on lead 34 from secondary winding 33 is insufficient to ionize neon bulb gate $G_1$. On the other hand, neon bulb gate $G_2$ is now open because primary winding 18 has a relatively low current therethrough owing to the changed conduction status of stage A2, while primary winding 20 still has a relatively high current therethrough. This unbalanced condition results in the appearance of a stepped up voltage on lead 38 of secondary winding 37. This voltage is of sufficient magnitude to ionize neon bulb gate $G_2$, thus completing the circuit from shift pulse input lead 21 to trigger input lead 42 of stage A3.

It is now obvious that when the second shift pulse is applied onto input lead 21, the status of stage A3 is changed from a "zero" to a "one," while stage A2 remains unchanged. Thus at the termination of this second shift pulse, assuming again that stage A1 has not been changed, the shift register now stores the binary combination 111. With this content in the stages, both neon bulb gates $G_1$ and $G_2$ are now effectively closed since the primary windings of transformers $T_1$ and $T_2$ have equal current therein.

The foregoing example illustrates how the shift register herein disclosed operates in accordance with the requirement, for example, that if stage A2 is different from stage A1, then stage A2 must change on the next shift pulse in order to agree with stage A1.

Push button switches 50 in each of the output circuits of paths P*b*, P*b'*, P*b''*, etc. of the respective stages provide means for resetting the stages to zero. Normally these push buttons are in the position shown in Fig. 1 and consequently have no effect on circuit operation. However, when these push buttons are depressed, paths P*b*, P*b'*, and P*b''*, etc. of the respective stages are effectively shorted to ground. Thus the opposite paths P*a*, P*a'*, P*a''*, etc. of the respective stages go into resonance, if they are not already in this state, and all stages attain their conventional "zero" status.

It is to be noted that the shift register can be connected into a "ring" if so desired. In such an arrangement it may be desirable that stage A1 be a single input flip-flop. The path P*a* of stage A1 would then be connected to ground through a first primary winding of a transformer whose other primary winding is connected to a corresponding path of the last stage of the register. The secondary of this latter transformer would then be connected to the starter electrode of a neon bulb gate whose output would connect to the trigger input of stage A1. In this manner, a relatively simple and convenient means would be provided for information recirculation.

Thus a preferred embodiment of a reliable, low power, ferro-resonant type shift register has been presented. Of course, the specific apparatus and circuits just described represent but one form of this invention and are not to be interpreted as a restriction or limitation thereof. It is apparent that modification and variations of this shift register, using other forms of bistable state circuits, for example, may occur to those skilled in the electronic art without departing from the spirit and scope of this invention as defined in the appended claims.

What is claimed is:

1. A shift register comprising: a plurality of A. C. operated flip-flop circuits, each said circuit including a high and low current conducting path and a trigger input capable of reversing the status of said paths when energized; means interconnecting corresponding paths of adjacent flip-flop circuits for generating a signal when said paths are in opposite operating states; a source of trigger signals; and gating means controlled by the signals from said interconnecting means for connecting said source of trigger signals to the trigger inputs of said flip-flop circuits, whereby the circuit status of each said flip-flop circuit is shifted to the succeeding flip-flop circuit in response to successive trigger signals from said source.

2. A shift register comprising: an A. C. voltage supply; a plurality of A. C. operated flip-flop circuits connected in parallel to said supply, each said flip-flop circuit including a high and low current conducting path and a trigger input; comparing means responsive to the current in corresponding paths of adjacent flip-flop circuits to generate a signal; a source of trigger signals; and gating means controlled by signals generated by said comparing means for connecting said source of trigger signals to the trigger input of each said flip-flop circuit.

3. In a shift register: an A. C. source; a chain of stages connected to said A. C. source, each said stage comprising a single input ferro-resonant type flip-flop circuit having a pair of branch circuits, each of said branch circuits comprising a series arrangement of a capacitor and a non-linear inductor; a trigger signal source; a gating means for connecting said trigger signal source to the input of each said flip-flop circuit; and A. C. responsive means connecting each stage to the succeeding stage for generating a signal controlling the gating means to a flip-flop stage when the preceding stage is in a different conducting status.

4. A shift register comprising: an A. C. source; a plurality of stages connected to said A. C. source, each said stage comprising a ferro-resonant type flip-flop circuit having a pair of branch circuits, each said branch circuit comprising a series arrangement of a capacitor and a non-linear inductor; a trigger circuit for each said flip-flop circuit; a trigger signal source; a plurality of cold cathode gas tubes, each including a first electrode connected to said trigger signal source, a second electrode connected to the trigger circuit of one of said flip-flop circuits, and a starter electrode; and a plurality of transformers, each having a pair of oppositely wound primary windings and a secondary winding, each said primary winding being connected in a branch of a different flip-flop circuit and each said secondary winding being connected to the starter electrode of a cold cathode gas tube.

5. A shift register comprising: an A. C. supply; a cascade of ferro-resonant flip-flop circuits, each corresponding to stages of said register, connected across said supply, each said flip-flop circuit having a high and low conducting path indicative of the contents of the stage, the first of said flip-flop circuits having a pair of trigger inputs and the remaining circuits having a single trigger input; a shift pulse source; and gating means responsive to A. C. signals generated by adjacent flip-flop circuit stages for connecting said shift pulse source to the single trigger input of each said flip-flop circuit stage when the previous stage is in an opposite state.

6. A shift register comprising: an A. C. supply; a cascade of ferro-resonant flip-flop circuits, each corresponding to a stage of said register, connected across said supply, each said flip-flop circuits having a high and low conducting path indicative of the contents of the stage and a trigger input capable of reversing the status of said paths when energized; a shift pulse source; and gating means controlled by A. C. signals generated by said flip-flop circuits for enabling shift pulses from said shift pulse source to energize the trigger input of a flip-flop circuit when the previous stage is in an opposite state.

7. A shift register or the like comprising: a cascade of A. C. operated bistable state stepping stages, each including an input thereto; a pulse source; a cold cathode gas tube for connecting said source to the input of each of the stages; and a transformer for connecting each stage to the next higher order stage, each said transformer having two oppositely wound primary windings and a secondary winding, each said primary winding connected to one of the adjacent stages, and said secondary winding connected to ionize the gas tube connected to the input of the higher order stage, whereby said gas tubes gate shift pulses to the input of a stage when the lower order stage is in an opposite state.

8. A shift register comprising: an A. C. supply; a chain of stages connected to said A. C. supply, each said stage comprising a ferro-resonant type flip-flop circuit having a pair of branch circuits, only one of which can have relatively high current while the other simultaneously has relatively low current, each of said branch circuits comprising a series arrangement of a capacitor, a non-linear inductor, and a primary winding; a trigger input circuit for each said flip-flop circuit; a trigger signal source; a cold cathode gas tube for connecting said trigger signal source to the input circuit of each said flip-flop circuit except the first in the chain; and a secondary winding responsive to the output of the combined primary windings of corresponding branches of adjacent flip-flop circuits for generating a voltage to ionize the gas tube connected to the input of the higher order flip-flop circuit when said branches are in opposite operating states, whereby the circuit status of each said flip-flop circuit is shifted to the succeeding flip-flop circuit in response to successive trigger signals from said source.

References Cited in the file of this patent

UNITED STATES PATENTS

| | | |
|---|---|---|
| 2,623,108 | Holden | Dec. 23, 1952 |
| 2,640,164 | Giel et al. | May 26, 1953 |
| 2,653,254 | Spitzer et al. | Sept. 22, 1953 |